United States Patent [19]

Rowlett, Jr.

[11] Patent Number: 4,953,745
[45] Date of Patent: Sep. 4, 1990

[54] MEDICATION DISPENSING APPARATUS

[75] Inventor: James R. Rowlett, Jr., 8102 E. Jefferson St., Detroit, Mich. 48214

[73] Assignee: James R. Rowlett, Jr., Royal Oak, Mich.

[21] Appl. No.: 828,559

[22] Filed: Feb. 20, 1986

Related U.S. Application Data

[63] Continuation of Ser. No. 533,234, Sep. 19, 1983, abandoned.

[51] Int. Cl.$^5$ .............................................. B65D 83/04
[52] U.S. Cl. ............................................ 221/5; 221/7; 221/82; 235/381
[58] Field of Search ......................... 221/2, 5, 7, 6, 82; 235/380, 381, 383; 364/479

[56] References Cited

U.S. PATENT DOCUMENTS

| | | | |
|---|---|---|---|
| 3,313,449 | 4/1967 | Parks | 221/6 |
| 3,556,342 | 1/1971 | Guarr | 221/2 |
| 3,780,907 | 12/1973 | Colburn et al. | 221/2 |
| 3,846,622 | 11/1974 | Meyer | 221/2 |
| 4,047,635 | 9/1977 | Bennett | 221/5 |
| 4,415,802 | 11/1983 | Long | 235/385 X |

Primary Examiner—F. J. Bartuska
Attorney, Agent, or Firm—Macmillan, Sobanski & Todd

[57] ABSTRACT

The present invention relates to an apparatus for dispensing a selected one of a plurality of drugs. The apparatus includes a plurality of individual dispensing mechanisms which are contained within a cabinet. Each of the dispensing mechanisms is adapted to store a plurality of a selected drug unit and is responsive to a selected one of a plurality of drug dispense signals for dispensing the selected drug unit. A control unit is responsive to an input authorization signal representing an operator, a patient identification signal representing a patient for which a drug is to be selected, and a drug select signal representing the drug and the amount to be dispensed. The control unit generates a drug dispense signal corresponding to the selected drug to cause the respective dispensing mechanism to dispense the selected drug. The control unit can be preprogrammed with a prescribed schedule for a particular patient such that a drug can be dispensed for that particular patient only during a certain time period. The control unit also includes a recording device for recording each dispensing transaction including the identity of the operator, the identity of the patient for which the drug is to be dispensed, and the dispensed drug. The control unit also maintains an inventory of the stored drugs.

14 Claims, 6 Drawing Sheets

MEDICATION DISPENSING APPARATUS

This application is a continuation application of co-pending application Ser. No. 533,234 filed Sept. 19, 1983 and now abandoned.

BACKGROUND OF THE INVENTION

The present invention relates generally to a medication dispensing apparatus adapted to dispense a selected one of a plurality of stored drugs and, in particular, to a dispensing apparatus having means for recording data concerning each dispensing transaction.

In a hospital, the traditional method of dispensing certain drugs, such as narcotics, to a nurse designated to administer the narcotic to a particular patient can be a relatively time consuming task. Typically, the narcotics are stored within a locked cabinet and the key required to unlock the cabinet is generally the responsibility of the floor head nurse. When a patient is scheduled to receive a prescribed drug which is contained within the cabinet, the nurse responsible for administering the drug must first obtain the key by locating the head nurse or the person to whom the head nurse had previously given the key. Once the nurse has obtained the key, the nurse can unlock the cabinet and remove the prescribed drug unit therefrom. At this time, the nurse is generally required to complete a record sheet with certain information relating to the prescribed drug. Typically, such information includes the type and dosage of the drug, the patient to whom the drug is to be administered, the patient's room number, the doctor's name, the date and time at which the drug has been removed from the cabinet, and the signature of the nurse who has removed the drug. Also, in hospitals which utilize a system for maintaining a current inventory of the drugs contained within the cabinet, the inventory count must be updated.

Generally, at the end of a working shift, it is the responsibility of the head nurse ending his/her shift and the head nurse beginning his/her shift to perform a physical inventory of the drugs stored within the locked cabinet. The inventory totals are compared with the inventory totals of the previous shift to determine the number of units of each type of drug which were utilized during the last shift. If there is a discrepancy between the number of drugs utilized as indicated by the completed record sheets and the number of drugs utilized as indicated from the physical inventory, this discrepancy is noted for later investigation purposes. In addition to the responsibility of the key to the locked cabinet and the inventory at the start and end of each shift, the head nurse is also responsible for maintaining a proper supply of drugs within the cabinet.

Aside from the fact that the above described method of dispensing medication is often a relatively time consuming task, such a method also suffers from a number of other disadvantages. One of these disadvantages includes the possibility that a nurse will either select an incorrect drug or an improper dosage of the correct drug. Also, there is the possibility that an error may occur in recording information relating to the dispensing transaction. Another problem relates to the tampering of the drugs and the unauthorized removal of drugs from the cabinet. While an inventory system is designed to detect a portion of such unauthorized removal, it is often difficult to determine which person is responsible for the pilferage.

Several automatic medication dispensing systems have been proposed. For example, U.S. Pat. Nos. 3,556,342 and 3,985,264 both disclose drug dispensing systems which are adapted to maintain a record of the individual drugs which are dispensed from the system. Examples of dispensing systems which can be programmed to dispense a desired dosage for a patient at preselected time intervals are disclosed in U.S. Pat. Nos. 3,369,697, 3,762,601, and 3,998,356.

SUMMARY OF THE INVENTION

The present invention relates to an apparatus for dispensing a selected one of a plurality of drugs which includes means for maintaining an accurate record of each dispensing transaction by recording such data as the operator to whom the drug is dispensed, the patient to whom the drug is to be administered, and the type and dosage of the dispensed drug. Thus, with the dispensing apparatus of the present invention, it is not necessary for the operator to record this information each time a drug is dispensed. Also, it is not necessary for the floor head nurses to perform the above-described end-of-shift inventories. In addition to minimizing recording errors, the features of the present invention greatly reduce the amount of the nurse's time required to dispense the drugs, and thus enable the nurse to increase the time spent with patients. Moreover, since every dispensing transaction includes the recording of the identity of both the nurse and the patient, the possibility of unauthorized use of the drugs is greatly reduced.

More specifically, the dispensing apparatus includes a cabinet which contains a plurality of individual dispensing mechanisms, each of which is adapted to store a plurality of selected drug units and is responsive to a selected one of a plurality of drug dispense signals for dispensing a selected one of the drug units. Means are provided for generating an input authorization signal representing an operator and for generating a patient identification signal representing the patient to whom the selected drug is to be administered. Means are also provided for generating a drug select signal representing the drug to be dispensed. The apparatus includes control means responsive to the input authorization signal, the patient identification signal, and the drug select signal for generating a drug dispense signal corresponding to the selected drug to cause the dispensing mechanism to dispense the selected drug. The control means further includes means for recording data concerning the dispensing transaction. Such data can include the identity of the operator, the identity of the patient, and the type and dosage of the dispensed drug.

In the preferred embodiment of the invention, the input authorization signal is generated by having an operator input a preselected code number into the apparatus by means of a keyboard provided on the front panel of the apparatus. The control means can then check the entered code number with a group of preprogrammed code numbers to determine whether the operator is authorized to use the dispensing apparatus. Alternatively, each operator can be provided with a separate identification card having a coded magnetic strip containing the predetermined code number and other operator identification data, and the control means can include a card reader to compare the entered code number with the number coded on the card.

The patient identification signal can be generated in response to the entering of the required information by the operator via the keyboard. Alternatively, the patient information can be preprogrammed into the apparatus and the patient can be identified by means of a preselected code number. Also, an identification card having a coded magnetic strip can be utilized with a card reader to identify the patient.

The present invention includes the option of preprogramming a patient's drug schedule into the apparatus. In these instances, the drugs and associated time schedule which have been prescribed for a particular patient is programmed into the machine, and the drugs for this patient would automatically be dispensed in accordance with the programmed schedule.

BRIEF DESCRIPTION OF THE DRAWINGS

The above, as well as other advantages of the present invention, will become readily apparent to one skilled in the art from reading the following detailed description in conjunction with the attached drawings, in which.

DESCRIPTION OF THE PREFERRED EMBODIMENT

Figure 1:
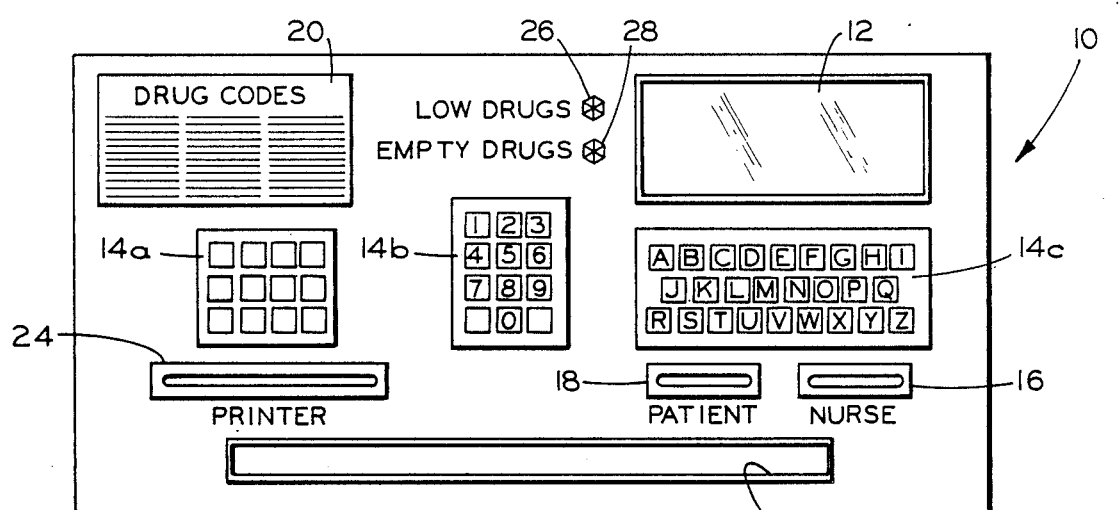
FIG. 1 is a front view of a control panel which can be utilized to operate the dispensing apparatus of the present invention.

Referring to FIG. 1, there is shown a front view of a control panel 10 which can be utilized in a dispensing apparatus according to the present invention. The control panel 10 includes a display 12 which is utilized to display a series of questions and instructions to assist an operator in operating the apparatus and selecting the desired drug. The operator communicates with the dispensing apparatus by means of a group of three keyboard units: a function select keyboard 14a, a numeric keyboard 14b and an alphabetic keyboard 14c.

In order to activate the dispensing apparatus, a nurse card reader 16 can be provided for receiving a nurse's identification card (not shown) having a coded magnetic strip identifying the person who is operating the apparatus. As will be discussed, in addition to the coded magnetic card, the operator may also be required to enter a predetermined code number to activate the apparatus.

Once the apparatus has been activated, the operator can then provide the apparatus with certain information concerning the patient to whom the dispensed drug is to be administered. Such information can include the patient's name, the patient's room number, the doctor's name, and a list of any drugs to which the patient is allergic. This information can be entered via the keyboards 14b and 14c.

After the required patient information has been received by the apparatus, the operator can then select the desired drug. As will be discussed, the apparatus can be operated in either a manual mode, wherein the operator selects the particular drug which is to be administered to the patient, or an automatic mode, wherein the patient's drug schedule has been preprogrammed into the apparatus and the prescribed drugs are automatically dispensed in accordance with the programmed schedule.

While the dispensing apparatus can be adapted to receive the information concerning an individual patient each time a drug is to be dispensed for the patient, the apparatus can also be preprogrammed with this information or, alternatively, the information can be preprogrammed on a separate magnetic patient card (not shown) which can then be inserted into a patient card reader 18.

The drugs which are stored in a particular dispensing apparatus can be listed on a drug code chart 20 which assigns a separate code number to each particular drug. Alternatively, the drug code chart could be listed on the display 12. Thus, in selecting a drug, an operator need only enter the code number of the selected drug. The dispensing apparatus includes a plurality of individual dispensing mechanisms adapted to dispense the selected drug into a dispensing trough 22. As will be discussed, the apparatus includes means for recording data concerning each dispensing transaction and maintaining an inventory of the stored drugs. A printer 24 is provided on the front panel 10 for supplying a transaction printout which identifies each dispensing transaction which has occurred during a predetermined time period.

The front panel 10 can be provided with a "low drugs" warning indicator 26 and an "empty drugs" warning indicator 28. The low drugs warning indicator 26 can sequentially flash the code numbers of each drug in which there are are less than a predetermined number of units. The empty drugs indicator 28 can flash the code numbers of those drugs which are not available.

Figure 2:
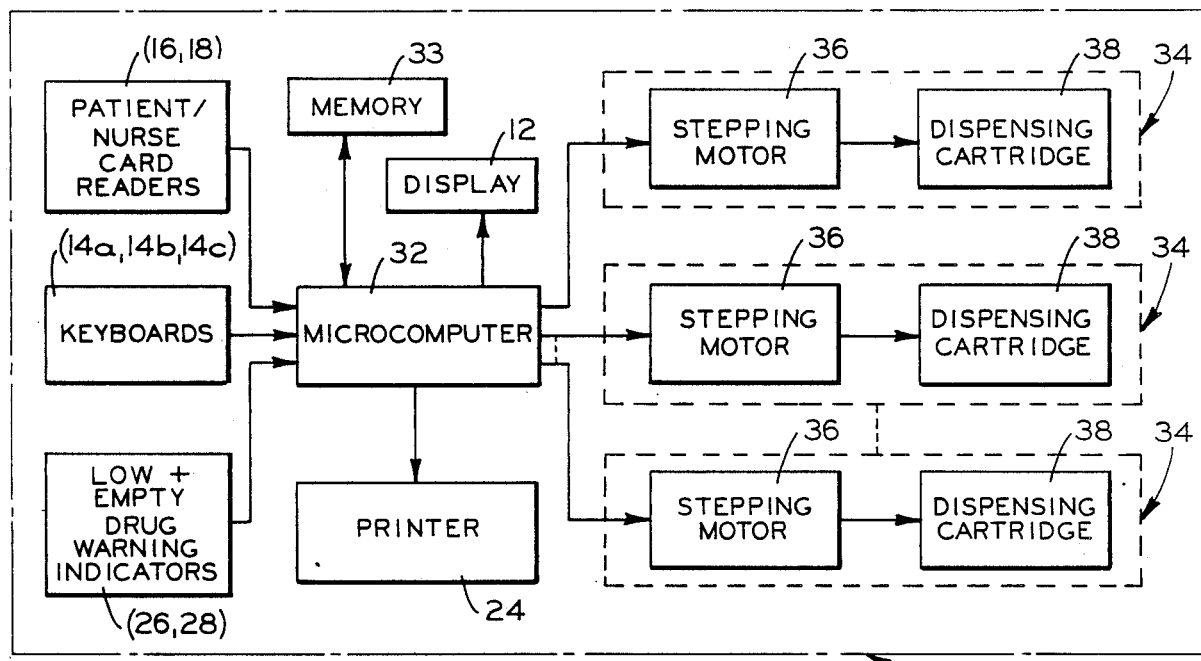
FIG. 2 is a block diagram of a dispensing apparatus of the present invention.

Referring to FIG. 2, there is shown a block diagram of a dispensing apparatus 30 according to the present invention. The dispensing apparatus 30 includes a microcomputer 32 which is programmed to control the operating functions of the dispensing apparatus 30. The microcomputer 32 is connected to receive operating instructions and data via the keyboards 16a, 16b and 16c, and patient and operator identification information via the card readers 16 and 18. The microcomputer 32 is connected to a memory device 33 for maintaining a record of the dispensing transactions. While not shown in the drawings, a back-up battery power supply unit can be provided to maintain the contents in the memory 33 in the event of a main power failure. The microcomputer is connected to the display screen 12 and the printer 24 to provide information to the operator. The low and empty drug warning indicators 26 and 28 are also controlled by the microcomputer 32.

The microcomputer 32 is coupled to generate control signals to a plurality of individual dispensing mechanisms 34 each comprising a stepping motor 36 coupled to operate a separate dispensing cartridge 38. As will be discussed, the microcomputer 32 controls the individual stepping motors 36 in order to cause the associated dispensing cartridge 38 to dispense a predetermined number of selected drug units.

Figure 3:
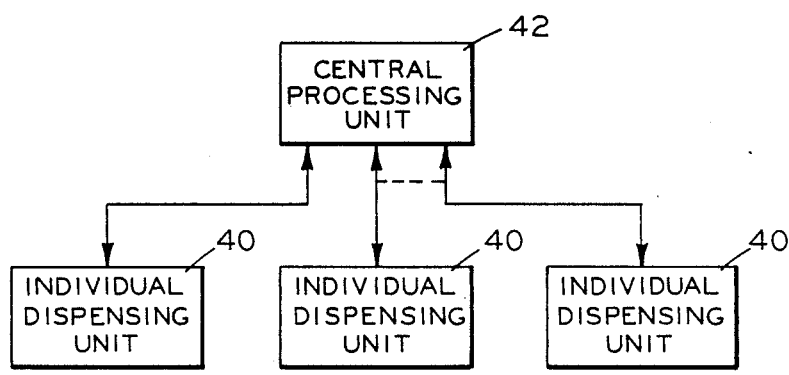
FIG. 3 is a block diagram of a dispensing system which utilizes a central processing unit and a plurality of individual dispensing units.

It should be noted that, while the present invention is described with reference to a dispensing apparatus which is basically self-contained within a single cabinet, it will be appreciated that the present invention could also be utilized on a broader scale. For example, as shown in FIG. 3, a plurality of individual dispensing units 40, each similar to the dispensing apparatus 30 of FIG. 2, can be coupled to a central processing unit 42 which monitors the operation of each dispensing unit 40. In such instances, the central processing unit 42 can include components which enable the individual dispensing units 40 to be simplified as compared to the dispensing apparatus 30 of FIG. 2. For example, the printer unit 24 and the external memory device 33 of the apparatus 30 can be located at the central processing unit 42, thereby eliminating the need for these components to be incorporated in each individual dispensing unit 40.

Figure 4:
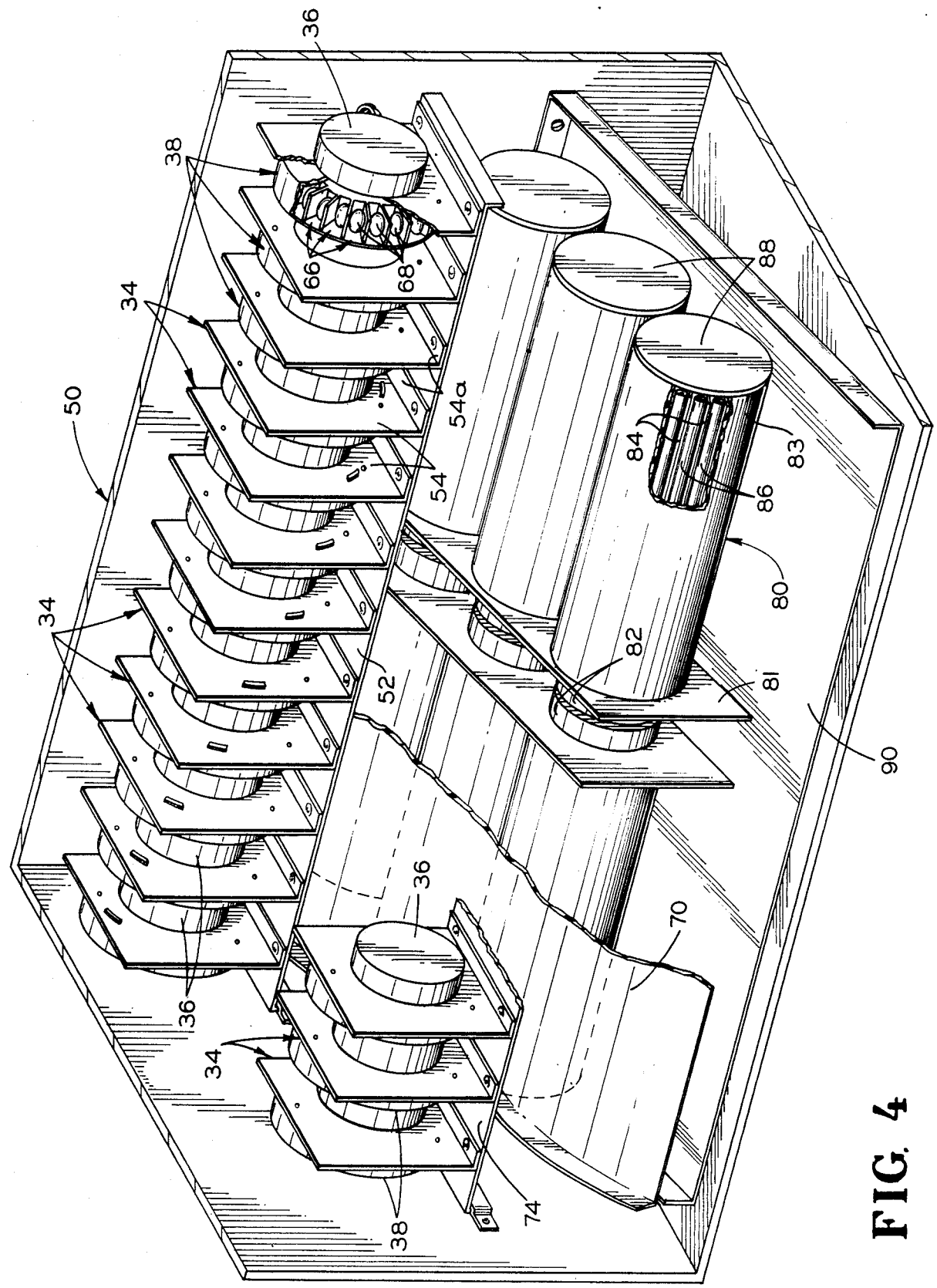
FIG. 4 is a perspective view illustrating the internal dispensing mechanism components of the apparatus of FIG. 2.
Figure 5:
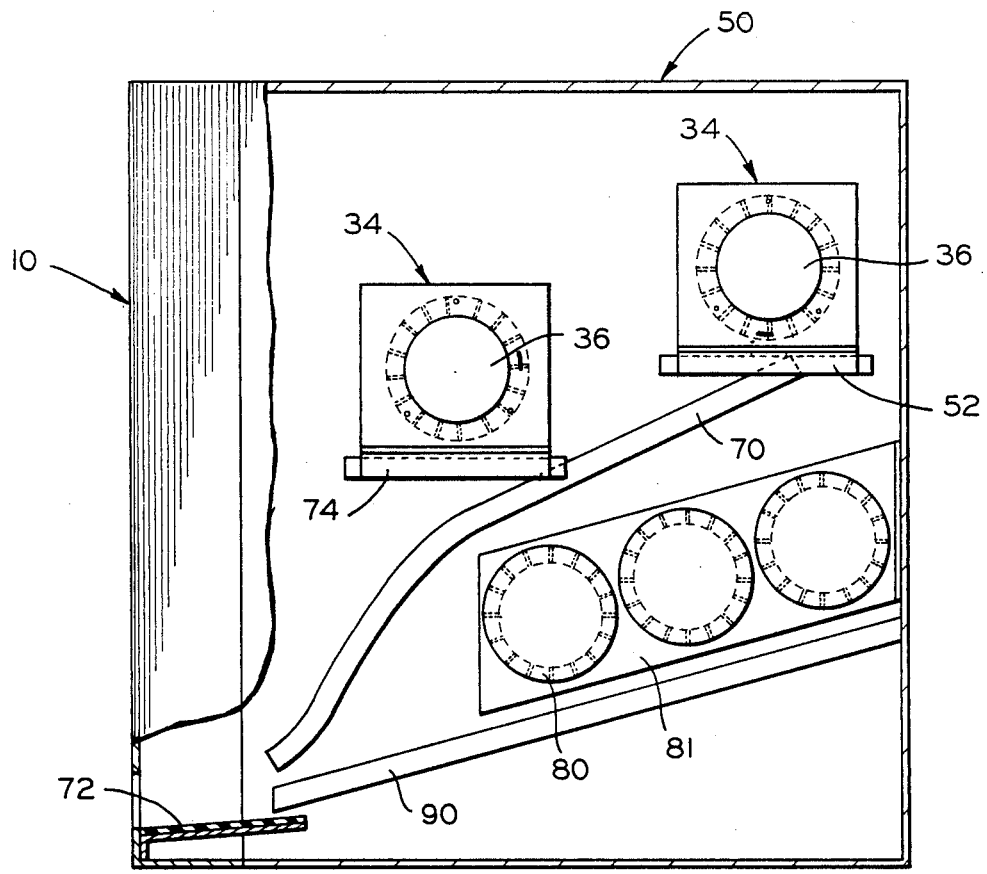
FIG. 5 is a side view of the dispensing mechanism components as illustrated in FIG. 4.

Referring to FIGS. 4 and 5, there is shown the dispensing mechanism components which are contained within a cabinet 50 of the dispensing apparatus 30. The components include a tray 52 for supporting a portion of the plurality of individual dispensing mechanisms 34. The outer ends of the tray 52 are releasably secured to the inner side walls of the cabinet 50. Each of the dispensing mechanisms 34 includes a mounting plate 54 having a lower flange portion 54a secured to the tray 52. The stepping motor 36 of the dispensing mechanism 34 is mounted on one side of the plate 54 and includes an output shaft which extends through the plate 54 and is adapted to operate the associated dispensing cartridge 38.

Figure 6:
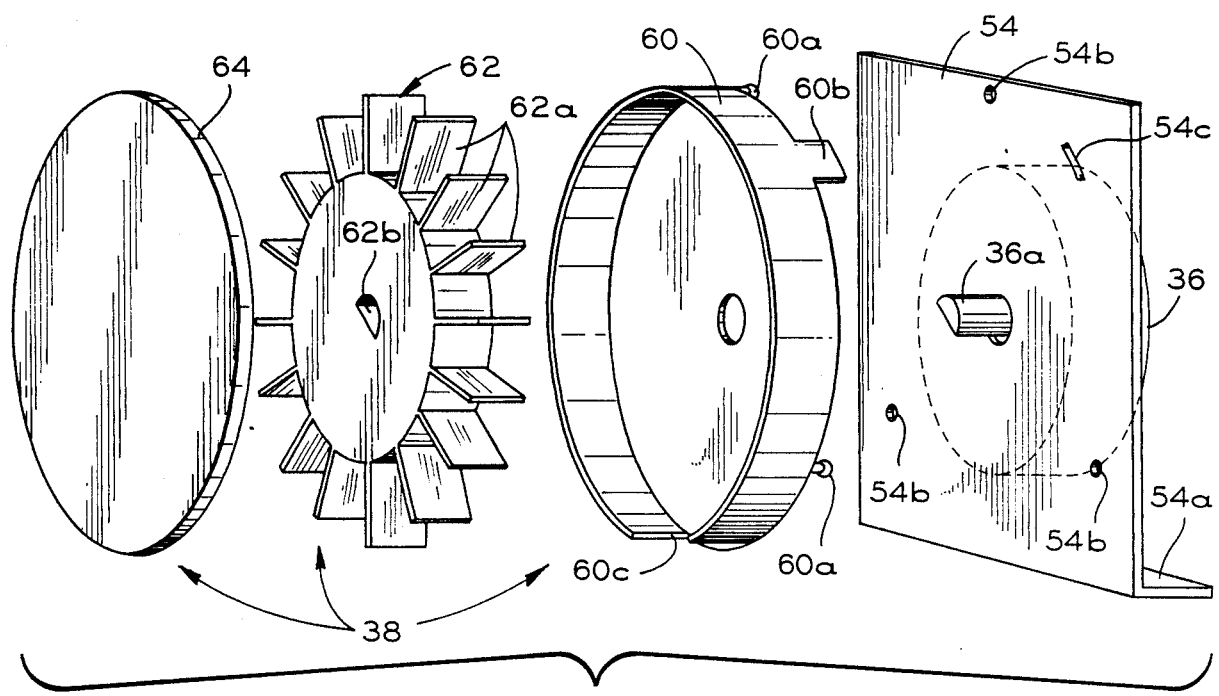
FIG. 6 is an exploded perspective view illustrating one of the individual dispensing mechanisms of FIGS. 4 and 5.

As shown in FIG. 6, the dispensing cartridge 36 comprises an outer housing 60, an inner rotatable vane unit 62, and an outer cap 64. The one side of the outer housing 60 is provided with a plurality of circumferentially spaced apart tab portions 60a which are adapted to be snapped into cooperating apertures 54b formed in the plate 54. It should be noted that the outer housing 60 of each of the individual dispensing cartridges 36 can be provided with a separate key tab 60b located at a selected angular position such that each cartridge 36 can only be snapped into a particular one of the plates 54 having a corresponding key tab receiving slot 54c. This provides an added safety feature by eliminating the possibility that one cartridge could be snapped into a mounting plate designated for a cartridge containing another drug.

The rotatable vane unit 62 includes a plurality of radially extending vanes 62a which cooperate with the outer circumferential wall of the housing 60 to define a plurality of individual pockets 66 (shown in FIG. 4) for receiving an individual drug unit 68. An opening 60c is formed in the outer wall at the lower end of the housing 60 and is adapted to permit the drug unit 68 within the pocket positioned immediately above the opening 60c to fall through the opening. The cover 64 is releasably secured to the housing 60 to maintain the drug units within the individual pockets. It will be appreciated that a dispensing cartridge of the type shown in FIG. 6 can be easily removed from the dispensing mechanism, refilled with a new supply of drugs, and then snapped back into the dispensing mechanism.

The stepping motor 36 includes an output shaft 36a which extends through the plate 54 and into a slot 60b in the vane unit 62 to rotate the vane unit 62 within the housing 60. When the stepping motor 36 is activated, the output shaft 36a is rotated a predetermined amount to cause the vane unit 62 of the associated dispensing cartridge to rotate and to release a drug unit 68 from one of the pockets 66. The drug unit 68 will fall through the opening 60c of the housing 60 and a corresponding opening (not shown) in the plate 52 and onto a slide 70 positioned below the dispensing mechanism 34. The slide 70 directs the drug unit 68 downwardly into the dispensing trough 22 which can be provided with a cushioned supporting surface 72. A second tray 74 can be used to support a second portion of the dispensing mechanisms 34 above a lower portion of the slide 70.

In some instances, the drug to be dispensed may be packaged in elongate tubular containers. In this case, a dispensing cartridge 80 of the type shown in FIG. 4 can be used. The dispensing cartridge 80 is releasably secured to one side of a mounting plate 81 and is operated by a stepping motor 82 mounted on the opposite side of the plate 81. The dispensing cartridge 80 includes an elongate housing 83 having an elongate vane unit 84 rotatably mounted therein which define longitudinally extending pockets for receiving the individual drug containing tubes 86. A cap 88 can be snapped to the end of the housing 83.

Figure 7A:
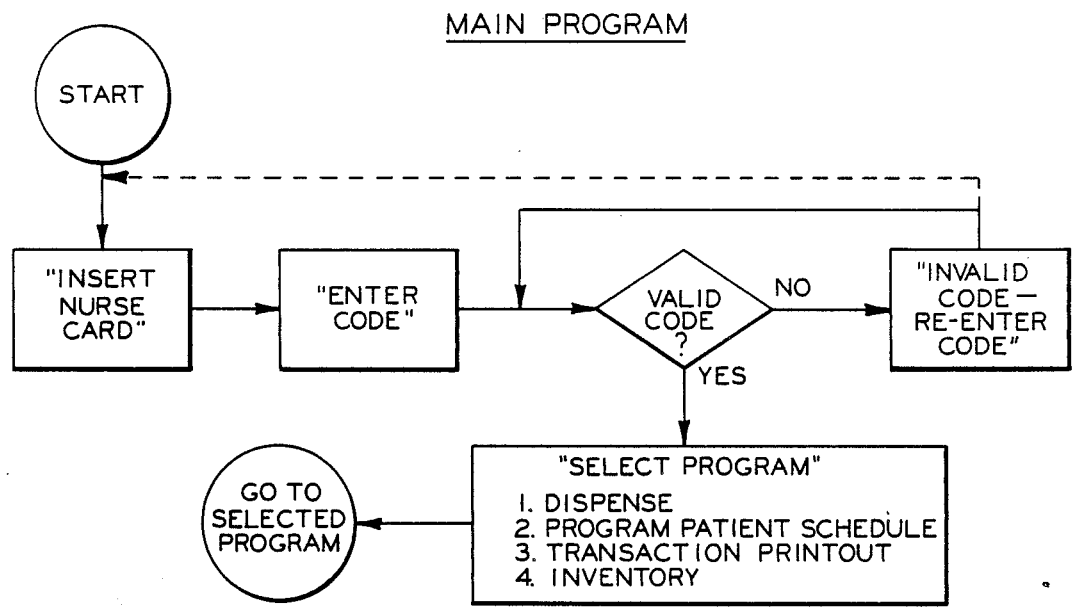
FIGS. 7a through 7d are flow diagrams illustrating the operation of the dispensing apparatus of the present invention.

Referring to FIGS. 7a through 7d, there are shown a group of flow diagrams which illustrate the overall operation of the dispensing apparatus of the present invention. Referring now to FIG. 7a, the main program initiates at a circle START and then enters a processing function wherein the message "INSERT NURSE CARD" is displayed on the screen 12. As previously mentioned, the operator or nurse identification card can be a plastic card having a magnetic coded strip thereon containing information which identifies the operator of the machine. As an alternative, this processing function can be eliminated and the identification data of each person authorized to operate the apparatus can be programmed into the apparatus.

After the operator has inserted the card into the card reader 16, the program enters a processing function wherein the message "ENTER CODE" is displayed on the screen 12. At this time, the operator is required to enter a particular authorization code number. This prevents unauthorized use of the dispensing apparatus in the event the operator's card is lost or misplaced. After the code has been entered, the program enters a decision point "VALID CODE?" wherein the program checks the entered code to determine whether it corresponds with a code programmed on the identification card or a code preprogrammed into the apparatus. If the entered code does not correspond to a valid code, the program exits the decision point at "NO" and enters a processing function to display the message "INVALID CODE—RE-ENTER CODE". The program then returns to check to see whether the newly entered code is valid. If a valid code is not received, the program returns to the beginning of the main program.

Once a valid code has been entered, the program enters a processing function wherein the message "SELECT PROGRAM" is displayed on the screen 12. At this time, the operator selects one of a group of programs adapted to be executed by the dispensing apparatus. Examples of some types of programs which the machine can execute include (1) a DISPENSE program which is selected in the event it is desired to dispense a selected drug for a particular patient, (2) a PROGRAM PATIENT SCHEDULE which is selected in the event the operator desires to preprogram a patient's drug schedule into the apparatus, (3) a TRANSACTION PRINTOUT program which is selected when the operator requires a printout of the previous dispense transactions occurring over a preselected time period, and (4) an INVENTORY program which provides the operator with an inventory of the stored drugs. These programs can be selected via designated keys on the function select keyboard 14a. After the operator has selected the desired program, the main program branches to the selected program.

Figure 7B:
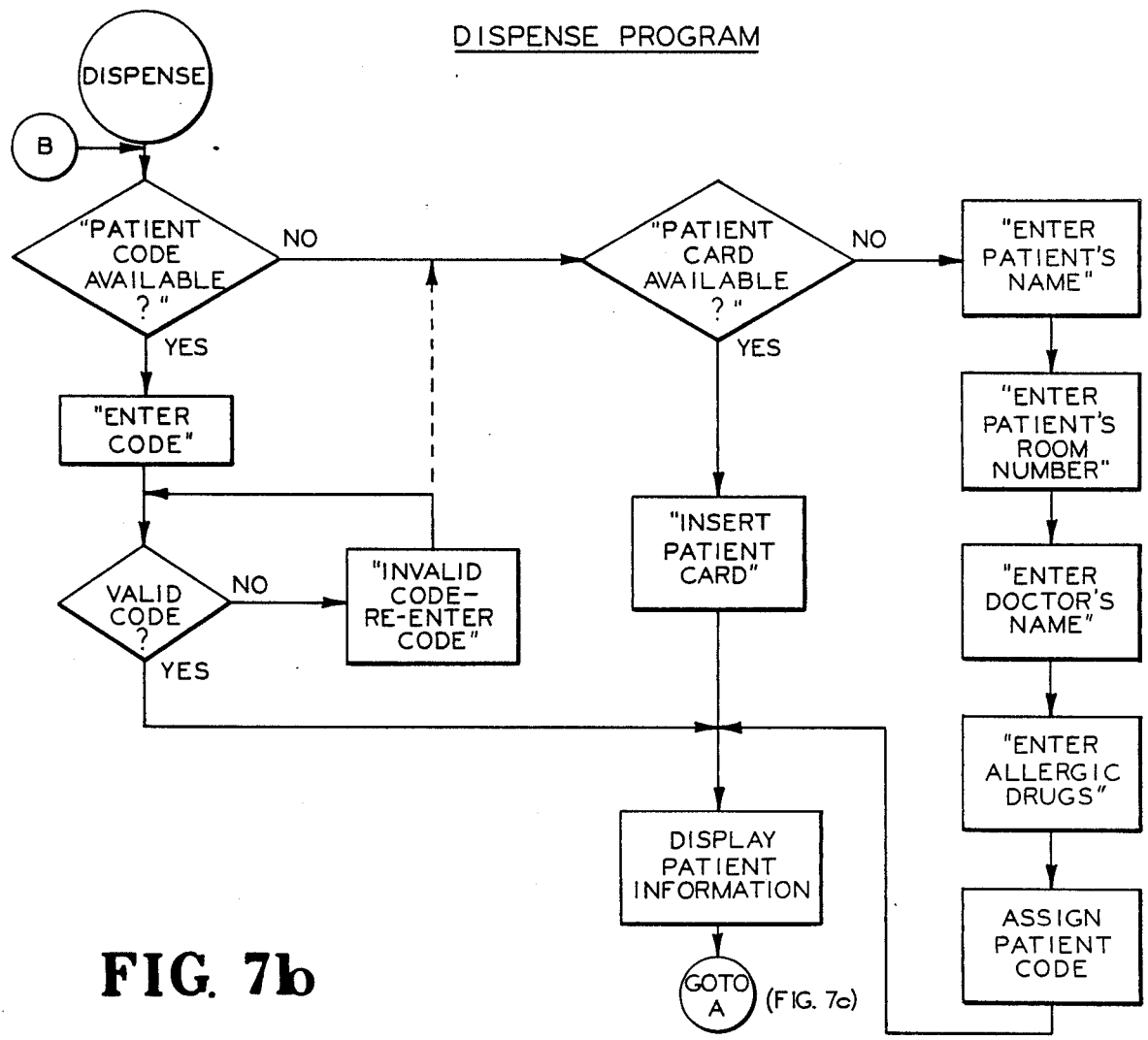
Figure 7C:
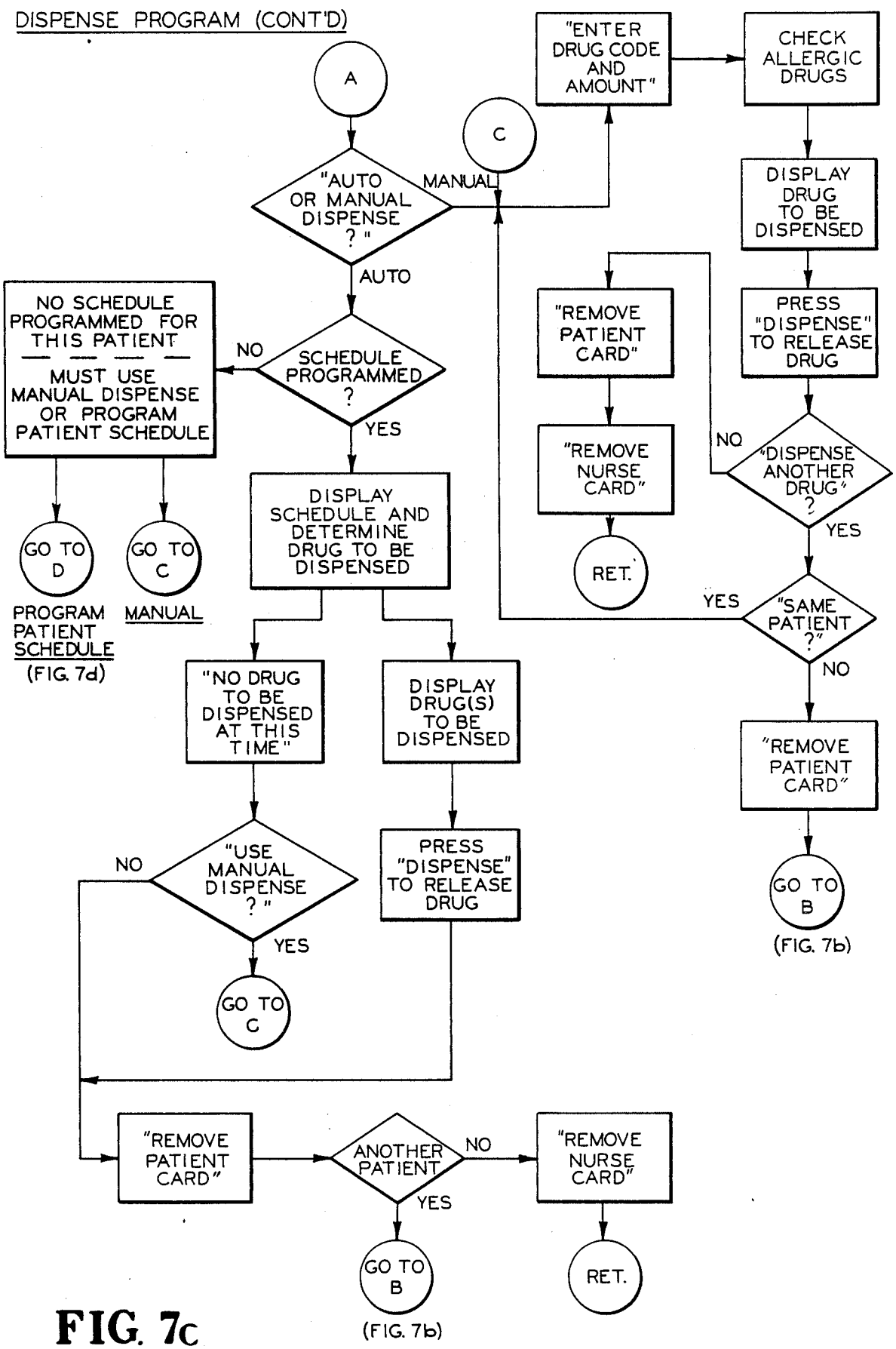

Referring to FIGS. 7b and 7c, there is shown a flow diagram of a DISPENSE program which can be utilized with the apparatus of the present invention. The program is initiated in FIG. 7b at a circle DISPENSE and enters a decision point wherein the question "PATIENT CODE AVAILABLE?" is displayed on the screen 12. As previously mentioned, a patient code is one means of identifying a particular patient. For example, if the information relating to a particular patient has been previously programmed into the machine, the machine can assign that patient a preselected code number. Thus, when it is desired to dispense a drug to a particular patient, an operator need only enter the particular code to identify the patient. If a patient code is available, the operator responds with a "YES" (by pressing a designated key on the keyboard 14a), and the program displays the message "ENTER CODE" on the screen 12. The operator then enters the code for the selected patient. The program checks the code in order to see whether it corresponds with a preprogrammed code and, if not, informs the operator that an invalid code has been received and instructs the operator to reenter the code.

If there is no patient code available, the operator responds to the question "PATIENT CODE AVAILABLE?" with a "NO" (by pressing a designated button on the function keyboard 14a), and the program enters a decision point wherein the question "PATIENT CARD AVAILABLE?" is displayed on the screen 12. The use of a plastic identification card having a magnetic strip which is preprogrammed with the required patient information is another means for identifying the selected patient. The patient identification card can be prepared and can be coded with the required patient information when the patient is admitted to the hospital. If a patient card is available, the operator responds with a "YES" and the machine enters a processing function to display the message "INSERT PATIENT CARD". The operator can then insert the card into the patient card reader 18.

If no patient card is available, the operator responds with a "NO" and the machine enters a series of processing functions which instruct the operator to manually enter particular data regarding the patient. Such data can include the patient's name, the patient's room number, the associated doctor's name, and any drugs to which the patient is allergic. The program will then assign a code number to the patient which can be used by the operator for a future dispensing transaction. After either the patient code has been received, the patient card has been inserted, or the patient information has been entered manually, the program enters a processing function wherein the patient information is displayed on the screen 12 for verification by the operator. The program then branches to point A in FIG. 7c.

After the required patient information has been entered into the apparatus and displayed for the operator, the program enters a decision point to display the question "AUTO OR MANUAL DISPENSE?". At this time, the operator must select either the automatic dispense mode or the manual dispense mode. As will be discussed, the automatic dispense mode is selected in the event the patient's drug schedule has been preprogrammed into the apparatus such that the apparatus automatically determines whether any prescribed drugs are to be dispensed to the patient at this time.

If the operator desires to utilize the manual dispense mode, a "MANUAL" key (which can be located on the keyboard 14a) is actuated and the program enters a processing function wherein the message "ENTER DRUG CODE AND AMOUNT" is displayed to the operator. At this time, the operator refers to the drug code chart printed on the front panel of the machine and enters the code number corresponding to the particular drug along with the number of desired units of the drug. When this information has been entered, the program enters a processing function "CHECK ALLERGIC DRUGS" wherein the program determines whether the drug requested by the operator corresponds with any of the allergic drugs of the particular patient. If the selected drug corresponds with an allergic drug, the program will inform the operator of this fact. Next, the program enters a processing function wherein the selected drug and the number of units selected is displayed on the screen. After the operator has verified his selection, the operator presses a "DISPENSE" key (located on the function keyboard 14a) to release the drug. The microcomputer then sends the required activation signal to the particular dispensing mechanism to activate the associated stepping motor and dispense the required drug.

After a selected drug has been dispensed, the program enters a decision point wherein the question "DISPENSE ANOTHER DRUG?" is displayed to the operator. If no other drug is to be dispensed, the operator responds with a "NO" and the program enters a processing function wherein, if a patient card has been inserted, the message "REMOVE PATIENT CARD" is displayed to the operator. Next, the program enters a processing function which instructs the operator to remove the nurse identification card. The program then returns to the main program.

If the operator desires to dispense another drug, whether to the same patient or a different patient, the operator responds to the question "DISPENSE ANOTHER DRUG?" with a "YES" and the program enters a decision point which displays the question "SAME PATIENT?". If another drug is not to be dispensed to the same patient, the operator responds with a "NO" wherein, if a patient card has been inserted, the program enters a processing function to display the message "REMOVE PATIENT CARD". From this point, the program jumps to point B at the beginning of the dispense program at which point the operator is requested to supply the necessary patient information. If another drug is to be dispensed to the same patient, the operator responds to the question "SAME PATIENT?" with a "YES" and the program returns to the beginning of the manual dispense program at point C and enters the processing function "ENTER DRUG CODE AND AMOUNT".

In the event a patient schedule has been previously programmed into the apparatus, the operator can utilize the automatic dispense mode of the dispense program. In such instances, the operator responds to the question "AUTO OR MANUAL DISPENSE?" by pressing an "AUTO" key (which can be located on the keyboard 14a). The program then enters the decision point SCHEDULE PROGRAMMED? to determine whether a drug schedule has been previously programmed for this patient. If no schedule has been programmed, the program branches to a processing function wherein a message "NO SCHEDULE PROGRAMMED FOR THIS PATIENT—MUST USE MANUAL DISPENSE OR PROGRAM PATIENT SCHEDULE". At this time, the operator must select whether he wishes to use the manual dispense mode, or whether he wishes to program the patient schedule. If he desires to use the manual dispense mode, he presses the "MANUAL" key and the program jumps to point C in the dispense program at the beginning of the manual dispense program. If the operator wishes to program a patient schedule in at this time, the operator presses the "PROGRAM PATIENT SCHEDULE" key (located on the keyboard 14a) and the program branches to point D in the program patient schedule in FIG. 7d, which program will be discussed in more detail hereinafter.

If a schedule has been previously programmed for this patient, the program branches from the decision point SCHEDULE PROGRAMMED? at "YES" and enters a processing function wherein the patient's programmed schedule is displayed on the screen for verification by an operator. The program will then determine which drug or drugs are to be dispensed at this time. If no drugs are to be dispensed at this time, the program enters a processing function which displays this message to the operator. From this point, the program enters a decision point wherein the message "USE MANUAL DISPENSE?" is displayed to the operator. By pressing the "YES" key, the program enters the manual dispense mode at point C. If the operator responds with a "NO", the program instructs the operator to remove the patient card and inquires as to whether a drug is to be dispensed to another patient. If the operator responds with a "YES", the program jumps to point B in the dispense program. If the operator responds with a "NO", the program instructs the operator to remove the nurse's card and returns to the main program.

In the event the programmed patient schedule indicates that a particular drug is to be administered to the patient, the dispense program enters a processing function wherein the drug or drugs to be dispensed to the patient are displayed on the screen 12. The operator can signal the unit to release those drugs by pressing the "DISPENSE" key. After the drugs have been dispensed, the program enters the series of instructions which ask the operator to remove the patient card and whether or not he desires to dispense drugs to another patient.

Figure 7D:
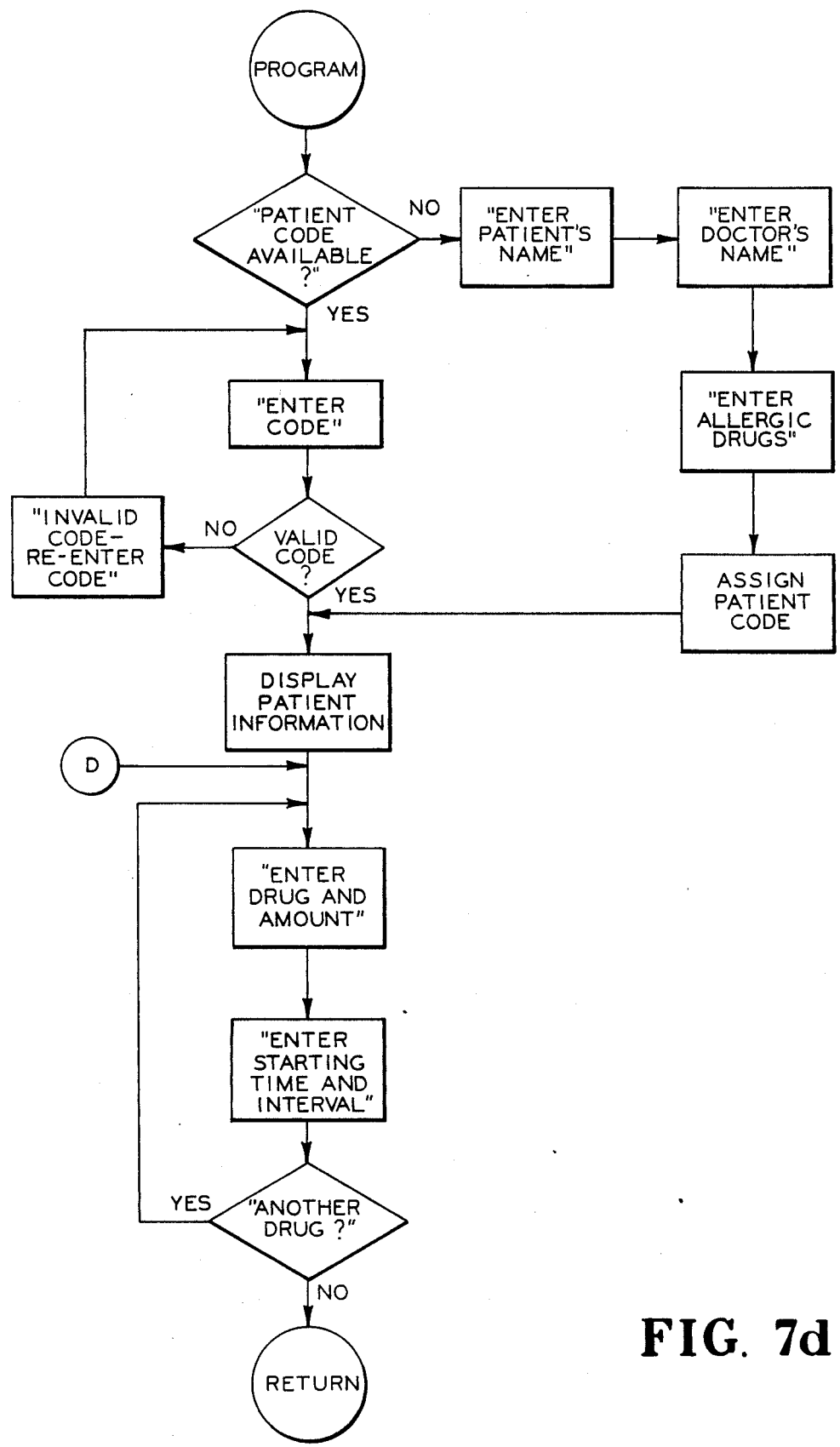

Referring to FIG. 7d, there is shown a flow diagram of the patient schedule program which is utilized by the operator when it is desired to program a particular patient drug schedule into the apparatus. When this particular program is selected by the operator, the program enters a decision point which displays the question "PATIENT CODE AVAILABLE?" to the operator. If a code has been assigned to the particular patient, the operator responds with a "YES" and the program enters a processing function wherein the message "ENTER CODE" is displayed to the operator. At this point, the operator can enter the code and the program checks to see whether the entered code is valid. If the code is not valid, the program informs the operator of an invalid code and asks the operator to reenter the code. If there is no patient code available, the program responds to the question "PATIENT CODE AVAILABLE?" with a "NO" and the program enters a series of processing functions wherein the operator is required to enter the necessary patient information. Once the patient information has been entered, the program assigns the patient a code. After the patient information has been made available to the apparatus, the program enters a processing function wherein the patient information is displayed on the screen 12 for verification by the operator.

Once the patient information has been entered, the program is now ready to receive the particular patient drug schedule. The program enters a processing function which requests that the operator enter the drug and the amount of the drug, and then enter the starting time and interval at which the drug is to be administered to the patient. After this data has been entered, the program enters a decision point wherein the question "ANOTHER DRUG?" is displayed. If the patient is to receive a second drug, the operator responds with a "YES" and the program returns to receive the data relating to the second drug. After all the drugs and the associated amounts and administering times have been entered, the operator responds to the question "ANOTHER DRUG?" with a "NO" and the program returns to the main program. It should be noted that, in some instances, it may be desired to program the patient's drug schedule on his patient identification card.

Other program functions which can be performed by the unit include a transaction printout and an inventory printout. Basically, the transaction printout contains a list of each dispensing transaction which has occurred between two selected time periods. The transaction printout can be a full printout wherein each drug dispensing transaction is included in the printout or, the apparatus can be instructed to only print those transactions relating to a particular patient, nurse, or doctor. The transaction printout can then be utilized as a record sheet which is initialled by the appropriate nurse and returned to the pharmacy for record purposes.

The operator can also request that an inventory list be either displayed or printed by the machine. The inventory printout would include a list of each drug stored by the machine, and a list of the remaining number of drug units stored in each dispensing mechanism.

In accordance with the provisions of the patent statutes, the principle and mode of operation of the present invention have been illustrated and described in what is considered to represent its preferred embodiment. However, it should be understood that the invention may be practiced otherwise than as specifically illustrated and described without departing from its spirit or scope.

What is claimed is:

1. An apparatus for dispensing a selected one of a plurality of drugs to a selected one of plurality of patents comprising:

a plurality of individual dispensing mechanisms, each of said dispensing mechanisms adapted to store a plurality of selected drug units and responsive to a selected one of a plurality of drug dispense signals for dispensing one of the selected drug units;

means for generating an input authorization signal representing an operator;

means for generating a selected one of a plurality of patient identification signals representing a selected patient for which a drug is to be selected;

means for generating a selected one of a plurality of drug select signals representing the drug to be dispensed;

control means responsive to the input authorization signal, the patient identification signal, and the drug select signal for generating a drug dispense signal corresponding to the selected drug to cause said dispensing mechanism to dispense the selected drug;

said control means including means responsive to said drug dispense signal for recording the dispensing transaction including the operator, the patient, and the dispensed drug;

said control means being operable to supply any of said plurality of drug units for any of said plurality of patients upon receiving the required input authorization, patient identification, and drug select signals.

2. The apparatus defined in claim 1 wherein said means for generating an input authorization signal includes input means for generating an input code signal identifying the operator, means for comparing the input code signal with a group of stored, authorized code signals, and means for generating the input authorization signal when the input code signal corresponds to one of the group of authorized code signals.

3. The apparatus defined in claim 1 wherein said means for generating an input authorization signal includes a magnetic card reader adapted to receive a magnetic card having operator identification data coded thereon including an authorized code signal, input means for generating an input code signal identifying the operator, and means for generating the input authorization signal when the input code signal corresponds to the authorized code signal.

4. The apparatus defined in claim 1 wherein said means for generating the patient identification signal includes input means for generating data signals concerning a selected patient, means for storing the data signals, and means responsive to the stored data signals for generating the patient identification signal.

5. The apparatus defined in claim 1 wherein said means for generating the patient identification signal includes a magnetic card reader adapted to receive a magnetic card having data signals concerning a selected patient stored thereon, and means responsive to the stored data signals for generating the patient identification signal.

6. The apparatus defined in claim 1 wherein said means for generating the patient identification signal includes input means for generating data signals concerning a selected patient, means for storing the data signals, means responsive to the data signals for generating a selected code signal corresponding to the stored data signals, means for generating an input code signal corresponding to the selected code signal, and means responsive to the input code signal for generating the patient identification signal.

7. The apparatus defined in claim 1 including means for storing a predetermined drug dispense schedule corresponding to a selected patient, said means for generating the drug select signal responsive to the predetermined drug dispense schedule for generating a drug select signal representing the drug to be dispensed in accordance with the predetermined drug dispense schedule.

8. The apparatus according to claim 1 including a printer means for providing a printed report of the dispensing transaction.

9. The apparatus according to claim 1 wherein each of said dispensing mechanisms includes an individual dispensing cartridge for storing a plurality of a selected drug unit, and means coupled to said dispensing cartridge and responsive to a selected one of the drug dispense signals for causing said dispensing cartridge to dispense the selected drug.

10. The apparatus according to claim 9 wherein said dispensing cartridge is reasonably mounted in said dispensing mechanism.

11. The apparatus according to claim 9 wherein said means coupled to said dispensing cartridge is a stepping motor.

12. The apparatus defined in claim 1 including an indicator means for indicating when the number of one of the selected drug units is below a predetermined amount.

13. The apparatus defined in claim 1 including means for generating a doctor identification signal representing a doctor having prescribed the selected drug for the selected patient, said control means responsive to said doctor identification signal for recording the doctor with the dispensing transaction.

14. The apparatus according to claim 1 wherein said drug select signal represents both the type and amount of the drug to be dispensed, and said control means is responsive to said drug select signal for recording both the type and amount of the drug dispensed with the dispensing transaction.

* * * * *